April 13, 1965 E. G. CLARK 3,178,584

TRANSISTOR BISTABLE DEVICE

Original Filed Dec. 20, 1956

INVENTOR.
EDWARD GARY CLARK

BY Frank H. Cullen

ATTORNEY 3,178,584

TRANSISTOR BISTABLE DEVICE

Edward Gary Clark, Paoli, Pa., assignor to Burroughs Corporation, Detroit, Mich., a corporation of Michigan Original application Dec. 20, 1956, Ser. No. 629,570, now Patent No. 2,945,965, dated July 19, 1960. Divided and this application May 18, 1960, Ser. No. 29,893
8 Claims. (Cl. 307—88.5)

This invention relates to bistable devices, and more particularly, to complementing flip-flops.

This is a division of application Serial Number 629,570, filed December 20, 1956, for Complementing Flip-Flops, now Patent Number 2,945,965, issued July 19, 1960, and assigned to the same assignee. Another divisional application, filed the same day as this application, is Serial Number 29,892, now Patent No. 2,994,788, issued Aug. 1, 1961.

A flip-flop is a device having two stable states and two input terminals (or types of input signals) each of which corresponds with one of the two states. The device remains in either of its two states until caused to change to its other state by the application of the corresponding signal. A flip-flop may be changed to a complementing flip-flop by the addition of steering gates. Means is provided for coupling the steering gates to the flip-flop and to a single input terminal. By the application of pulses to the input terminal, signals are generated in the steering gates which cause the flip-flop to change state for each pulse applied.

In a complementing flip-flop having two steering gates, one of which is enabled and the other of which is disabled, the action in response to each complementing input signal, or each complementing input puse, can be divided into two events. The first event results from applying a complementing pulse to the enabled steering gate. The enabled steering gate then applies a pulse to the proper input terminal of the flip-flop, which pulse causes the flip-flop to change to its other state. The second event is the reversal of the steering gates in preparation for the next pulse of the complementing input signal.

When the steering gates reverse, the gate that was enabled at the time the first complementing pulse was initially applied becomes disabled, and the gate that was disabled becomes enabled. Each complementing input pulse has a given width, the period of time the pulse is present or applied. A phenomena known in the art as time race occurs if the steering gates reverse while the complementing pulse, which is responsible for the reversal, is still present. When time race occurs, the complementing input pulse will cause the flip-flop to return to its initial state; and the flip-flop will continue to change state, or oscillate, as long as the complementing input pulse is present. The final state of the complementing flip-flop will then be a function of the pulse width of each complementing input pulse.

Time race has heretofore been avoided by delaying the reversal of the steering gates due to the change of state of the flip-flop for a fixed period of time by various types of delay circuits, such as integrating circuits, delay lines, etc. A complementing flip-flop having some means for delaying the reversal of the steering gates for a fixed period will hereafter be referred to as having unconditional steering. Time race in a complementing flip-flop having unconditional steering is prevented by restricting the width of each complementing pulse of the input signal so that it is less than the period of the delay. When a plurality of complementing flip-flops are cascaded to form a counter, it is necessary to provide pulse standardizers between the stages or to provide the equivalent internal action limiting the effective duration (or more specifically, the amplitude time product) of the complementing pulse inputs. As a result, the maximum pulse repetition frequency for a complementing flip-flop having unconditional steering means is substantially less than the maximum pulse repetition frequency of the corresponding noncomplementing flip-flop because of the design tolerances required for the delay circuits and the input pulse standardizer circuits.

The complementing flip-flops disclosed and claimed herein are provided with conditional steering means. When a complementing input pulse is applied to one of these circuits, the enabled steering gate applies a pulse to the input terminal of the flip-flop, which pulse will cause the flip-flop to change its state. Means are provided to prevent reversal of the steering gates until each complementing pulse of the input signal terminates, or is no longer present. Thus the reversal of the steering gates is conditioned upon the removal of each complementing input pulse.

Conditional steering represents the ideal means for preventing time race in a complementing flip-flop since the length of the period of the delay between the change in state of the flip-flop and the reversal of the steering gates is determined by the width of each complementing input pulse. As a consequence, a complementing flip-flop with conditional steering means, as taught herein, will operate with complementing input pulses, the width of which may be of indefinite duration, e.g., a change in D.C. level. Since there are no fixed time delays incorporated in a complementing flip-flop having conditional steering, the maximum pulse repetition frequency of a complementing flip-flop with conditional steering is substantially the upper frequency limit of the corresponding noncomplementing flip-flop.

It is, therefore, an object of this invention to improve complementing flip-flops.

A further object of this invention is to provide complementing flip-flops having conditional steering means.

It is a still further object of this invention to provide complementing flip-flops in which the reversal of the steering means is conditioned upon the removal of each complementing input pulse.

It is still another object of this invention to provide complementing flip-flops in which the width of each complementing input pulse may be substantially of any duration.

It is another object of this invention to provide complementing flip-flops in which the pulse width of each complementing input pulse, in excess of that necessary to trigger the complementing flip-flop, is not a factor in the proper operation of the complementing flip-flops.

Other objects and many of the attendant advantages of this invention will be readily appreciated as the same become better understood by reference to the following detailed description when considered in connection with the accompanying drawings.

FIG. 1 is a schematic diagram of an embodiment of the invention;

FIGS. 2*a*, 2*b*, 2*c*, and 2*d* are wave forms illustrating the operation of the circuit of FIG. 1;

Figure 1:
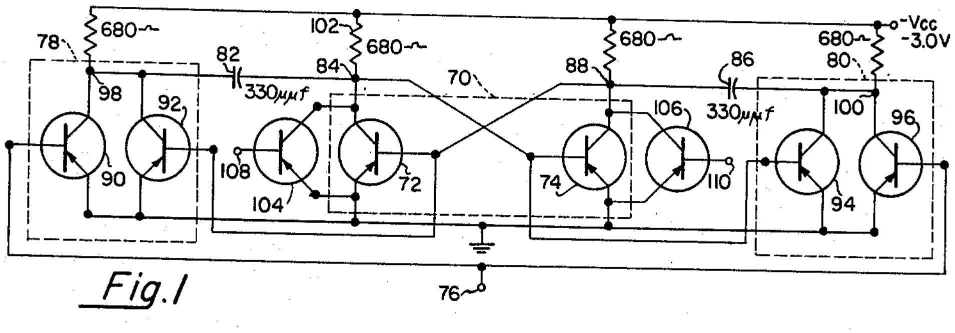

In FIG. 1 there is illustrated an embodiment of a complementing flip-flop provided with conditional steering means in which A.C. coupling between the master flip-flop and the steering gates is provided. Master flip-flop 70 comprises transistors 72, 74, preferably junction transistors, which are cross-coupled (base to collector) to provide a saturation flip-flop having two distinguishable stable states. Input signals which are supplied to input terminal 76 of the complementing flip-flop are applied to steering and inhibit gates 78, 80. The output of gate 78 is applied through capacitor 82 to input terminal 84 of master flip-flop 70, and the output of gate 80 is applied through capacitor 86 to input terminal 88.

Gate 78 comprises junction transistors 90, 92, which are connected in parallel, and gate 80 comprises junction transistors 94, 96 connected in parallel. Input terminal 76 of the complementing flip-flop is directly connected to the bases of transistors 90, 96 of the steering and inhibit gates 78, 80, respectively.

The base of transistor 92 of gate 78 is directly connected to input terminal 88, and the base of transistor 94 of gate 80 is directly connected to input terminal 84. The collectors of transistors 90, 92 of gate 78 are connected by capacitor 82 to input terminal 84 of master flip-flop 70, and the collectors of transistors 94, 96 of gate 78 are connected by capacitor 86 to input terminal 88 of master flip-flop 70.

The wave forms of FIGS. 2*a*, 2*b*, 2*c*, and 2*d* illustrate a complete cycle of operation of the device illustrated in FIG. 1. Assuming the initial state of master flip-flop 70 is such that transistor 74 is bottomed and that transistor 72 is cut off, then transistors 90, 92 will both be cut off since input terminal 88 is substantially at ground potential, and in the absence of an input pulse, input terminal 76 is also substantially at ground potential; the potential of terminal 98 will be negative; and parallel steering and inhibit gate 78 will be enabled. Steering and inhibit gate 80 will be disabled since transistor 94 will be bottomed due to the negative potential of its base, which is connected to input terminal 84. This causes terminal 100 to be substantially at ground potential. The application of the leading edge, or more of a negative complementing pulse to input terminal 76 at time $t_1$ causes transistor 90 to bottom. When transistor 90 bottoms, the potential of terminal 98 increases, i.e., becomes more positive, and reaches a value substantially at ground level. This applies the charge which is on capacitor 82 to input terminal 84 and the base of transistor 74, cutting off transistor 74. Capacitor 82 is charged because the potential of terminal 98 is substantially equal to $V_{cc}$, since substantially no current flows through cut-off transistors 90, 92, while the potential of terminal 84 is more positive; i.e., closer to ground potential, due to the base currents of transistors 74, 94 flowing through load resistor 102 and because of the base clamping action of transistors 74, 94.

When transistor 74 cuts off, the potential of input terminal 88 becomes negative, which negative potential is applied to the base of transistor 72, bottoming it and maintaining the potential of input terminal 84 substantially at ground level; and master flip-flop 70 has changed state. As a result, transistor 94 is cut off, and transistor 92 bottoms. This, however, has no effect on the potential of terminals 98, 100 since they are both held approximately at ground level by the presence of the negative input pulse on the bases of transistors 90, 96.

Figures 2A, 2B, 2C, 2D:
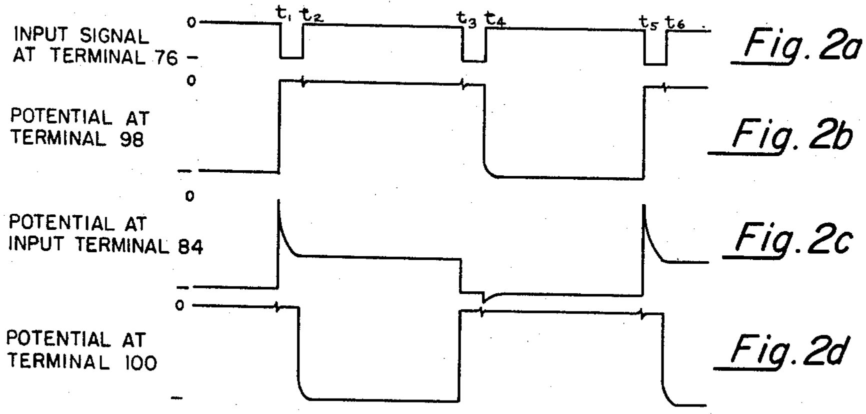

At the conclusion of the first pulse at time $t_2$, gates 78, 80 are released from control by the complementing input pulse, to control by master flip-flop 70. Gates 78, 80 then reverse, assuming the states determined by the master flip-flop; i.e., gate 80 is enabled, and gate 78 is disabled. Capacitor 86 then charges to complete the half cycle. The pulse generated by the charging of capacitor 86 is of such polarity that it has no effect on the master flip-flop 70. In addition, the base clamping action of transistor 72 substantially reduces the amplitude of this pulse. The representation of a similar pulse due to recharging of capacitor 82 at time $t_4$ on FIG. 2*c* is approximately to scale.

At the end of the first half cycle, transistor 72 is bottomed and transistor 74 is cut off, transistors 90, 96 are both cut off, transistor 92 of gate 78 is bottomed, disabling gate 78, and transistor 94 of gate 80 is cut off, enabling gate 80. The application of the next, or second, negative complementing pulse at time $t_3$ bottoms transistor 96 of gate 80, which causes the potential of terminal 100 to become more positive. This in turn applies the charge on capacitor 86 to input terminal 88, cutting off transistor 72. This then causes transistor 74 to bottom, changing the state of master flip-flop 70 back to its initial state. As a result of transistor 74 bottoming, transistor 92 is cut off. The potentials of terminals 98, 100 remain substantially at ground level between times $t_3$ and $t_4$ because transistors 90, 96 are both bottomed by the presence of the second complemeting pulse. When the second pulse terminates at time $t_4$, transistors 90, 96 both cut off. Transistor 94 is bottomed because of the state of master flip-flop 70, and this disables gate 80. Transistor 92 is cut off because of the state of master flip-flop 70, and this enables gate 78. Capacitor 82 then recharges, completing a cycle of operation.

Transistor 104 is connected in parallel with transistor 72, and transistor 106 is connected in parallel with transistor 74. The application of the negative pulse to set terminal 108, connected to the base of transistor 104, will cause transistor 104 to bottom and will cause the master flip-flop 70 to assume a state in which terminal 84 is substantially at ground potential. The application of a negative pulse to reset terminal 110, which is connected to the base of transistor 106, will cause the master flip-flop 70 to assume its other state, the state in which terminal 88 is substantially at ground potential. The state of the complementing flip-flop may be determined by the potentials of terminal 84 or terminal 88, which may serve as output terminals for the complementing flip-flop.

The recharging times of capacitors 82, 86 limit the maximum pulse repetition frequency of the complementing flip-flop illustrated in FIG. 1. Mathematical analysis indicates that the maximum pulse repetition frequency of the complementing flip-flop is approximately one half that of the corresponding non-complementing flip-flop; i.e., master flip-flop 70 by itself.

Figure 3:
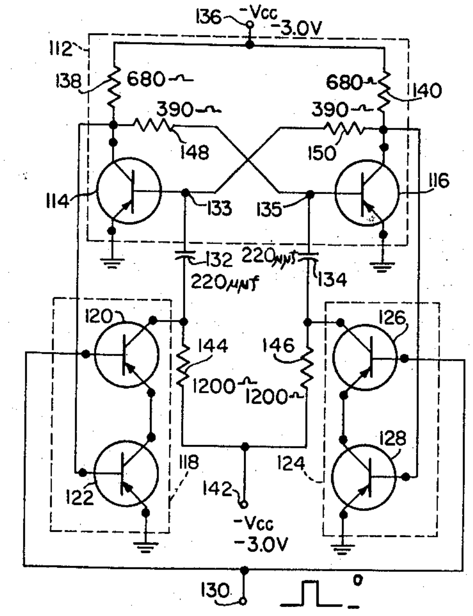
FIG. 3 is a schematic diagram of a second embodiment of the invention.
Figure 4:
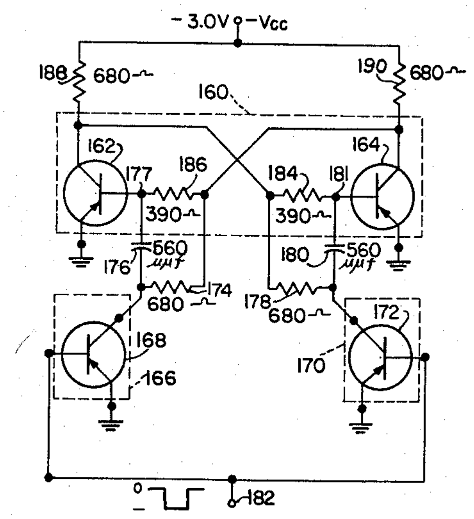
FIG. 4 is a schematic diagram of a third embodiment of the invention.

Certain conclusions can be derived from a study of the circuit of FIG. 1 which are useful in deriving the modifications illustrated in FIGS. 3 and 4. The steering gates are coupled to the master flip-flop by means of differentiating circuits, which provide D.C. isolation. The steering gates are enabled or disabled by being directly coupled to the master flip-flop. The change in the enabling D.C. supplied to enable a steering gate during a flip-flop transition is in the same sense (direction) as the complementing pulse. From this it follows that the pulse from the disabled gate capacitor on the nontriggering edge of the complementing pulse is in the direction to maintain the master flip-flop state produced by the triggering edge. Further, when the differentiation is achieved by capacitive coupling to the bases of the transistors of the master flip-flop, then the D.C. potential applied to the steering gates must be of such polarity that the charge on the disabled gate coupling capacitor is substantially zero at rest.

The circuit of FIG. 1 is claimed in my original application, now Patent No. 2,945,965 of July 19, 1960, of which this application is a division.

In FIG. 3 there is illustrated another form of a conditional steering complementing flip-flop in which the steering gates are coupled by capacitors to the master flip-flop. Master flip-flop 112 is composed of two transistors 114, 116 which are cross-coupled to form a saturation flip-flop. Combined steering and inhibit gate 118 has two transistors 120, 122 connected in series. Similarly, steering and inhibit gate 124 is provided with two transistors 126, 128 connected in series. Input terminal 130 of the complementing flip-flop is directly connected to the bases of transistors 120, 126. The base of transistor 122 of gate 118 is directly connected to the collector of transistor 114 of master flip-flop 112; and the base of transistor 128 is directly connected to the collector of transistor 116 of master flip-flop 112.

The collector of transistor 120 is coupled through capacitor 132 to input terminal 133 of master flip-flop 112, the base of transistor 114. Capacitor 134 is connected between the collector of transistor 126 of gate 124 and input terminal 135 of master flip-flop 112, the base of transistor 116.

Collector supply potential $V_{cc}$ of the proper polarity is applied to terminal 136 and through load resistors 138, 140 to the collectors of transistors 114, 116 of master flip-flop 112. Terminal 142 is also adapted to be connected to a source of collector potential $V_{cc}$ of the proper polarity and is connected through load resistor 144 to the collector of transistor 120 of gate 118 and through load resistor 146 to the collector of transistor 126 of gate 124.

Assuming initially that transistor 114 of master flip-flop 112 is cut off, the potential of its collector will be negative, and this negative potential which is applied through resistor 148 to the base of transistor 116 of input terminal 135 causes it to bottom. When transistor 116 bottoms, its collector increases substantially to ground potential; and since the collector of transistor 116 is connected to the base of transistor 114 through resistor 150, the potential of the collector of transistor 116 maintains transistor 114 cut off. The base of transistor 122 of gate 118 is connected to the collector of transistor 114, and thus transistor 122 is bottomed, causing the potential of the emitter of transistor 120 to be substantially at ground potential. The base of transistor 128, which is directly connected to the collector of transistor 116, is substantially at ground potential, which cuts off transistor 128.

The circuit of FIG. 3 requires that each complementing input pulse be positive going and that the potential of input terminal 130, in the absence of an input pulse, is sufficiently negative to bottom transistors 120, 126 if their emitter circuits are closed. Thus transistor 120 will be bottomed so that the potential of its collector is substantially at ground potential, and gate 118 is enabled. Since transistor 128 is cut off, the emitter circuit of transistor 126 is open, and therefore, the potential of the collector of transistor 126 will be negative and gate 124 is disabled.

The application of positive going complementing pulses to the bases of transistors 120, 126 of gates 118, 124 cuts off these transistors if on. The potential of the collector of transistor 120, which was heretofore substantially at ground potential, suddenly becomes negative, applying a negative pulse to input terminl 133 of master flip-flop 112, which causes transistor 114 to bottom. The potential of the collector of transistor 114 increases to approximately ground potential, cutting off transistor 116, which changes the state of master flip-flop 112. The base of transistor 122 is now substantially at ground potential, which cuts off transistor 122. The base of transistor 128 is now negative, causing it to bottom. However, so long as the complementing pulse is present, both transistors 120 and 126 will remain cut off and gates 118, 124 cannot reverse.

At the termination of the first complementing pulse, the baseso f transistors 120, 126 become negative. Transistor 126 bottoms since its emitter circuit closed when transistor 128 bottomed at the time master flip-flop 112 changed state, and gate 124 is enabled. The collector of transistor 120 remains negative since transistor 122 was biased off when master flip-flop 112 changed state, and gate 118 is disabled. Thus the reversal of transistors 120, 126 and the reversal of gates 118, 124 is conditioned on the removal of the complementing input pulse.

The application of the next, or second, complementing input pulse will cause transistor 126 to cut off. The potential of the collector of transistor 126 drops, or becomes more negative, which applied a negative pulse to the base of transistor 116, causing master flip-flop 112 to change its state once again. As a consequence, the voltages of the bases of transistors 122, 128 reverse, and upon the removal of the second complementing pulse, the gates reverse, with gate 118 becoming enabled and gate 124 becoming disabled.

The state of master flip-flop 112 may be determined by the potentials of the collectors of transistors 114, 116, which may also be the output terminals of the complementing flip-flop, as is well known in the art. Master flip-flop 112 may be set and reset by the use of a pair of transistors, one connected in parallel with transistor 114 and the other connected in parallel with transistor 116, as is illustrated and described with respect to FIG. 1.

The use of A.C. coupling by the steering and inhibit gates of the master flip-flop permits an even greater reduction in the number of transistors required. The complementing flip-flop illustrated in FIG. 4 has four transistors. Each steering and inhibit gate is comprised of a single transistor.

In FIG. 4 master flip-flop 160 comprises two junction transistors 162, 164, which are cross-coupled to form a saturation flip-flop. Steering and inhibit gate 166 is comprised of transistor 168, and steering and inhibit gate 170 is comprised of transistor 172. The collector of transistor 168 is connected through isolating resistor 174 to the collector of transistor 164 of master flip-flop 160. The collector of transistor 168 is also connected by capacitor 176 to input terminal 177 of master flip-flop 160, the base of transistor 162.

The collector of transistor 172 is connected by isolating resistor 178 to the collector of transistor 162 and is connected by capacitor 180 to input terminal 181 of master flip-flop 160, the base of transistor 164. The bases of transistors 168, 172 are directly connected to input terminal 182 of the complementing flip-flop.

Assuming that transistor 162 of master flip-flop 160 is initially cut off and that transistor 164 is bottomed, then the collector of transistor 162 will be negative with respect to ground, which negative potential is applied to the base of transistor 164 through coupling resistor 184. This negative potential is sufficient to cause and to maintain transistor 164 bottomed. The potential of the collector of the transistor 164 will be substantially at ground level; and since the collector of transistor 164 is connected through coupling resistor 186 to the base of transistor 162, transistor 162 is maintained in its cut-off state. The collector of transistor 168 of gate 166 will also be substantially at ground potential since it is connected through isolating resistor 174 to the collector of transistor 164, and gate 166 is disabled.

The collector of transistor 172 of gate 170 will be at a negative potential since it is connected through isolating resistor 178 to the collector of transistor 162. Thus gate 170 is enabled but the transistor 172 is presently cut-off. The potential of input terminal 182 is substantially at ground potential, in the absence of a complementing input pulse, which maintains transistors 168, 172 cut off as noted.

The application of a negative complementing pulse to input terminal 182 will have no effect on transistor 168 of disabled gate 166 since the collector of transistor 168 was substantially at ground potential. The application of a negative pulse to the base of transistor 172 will cause it to bottom, raising its collector substantially to ground potential, which applies a positive going pulse to input terminal 181. This positive pulse on the base of transistor 164 cuts off transistor 164. The collector of transistor 164 then becomes negative, which causes transistor 162 to bottom, raising the potential of the collector of transistor 162 to substantially ground potential, which maintains transistor 164 in its cut-off condition, and master flip-flop 160 has changed its state.

During the duration of the first negative complementing pulse, the potential of the collectors of transistors 168, 172 cannot go substantially negative and gates 166, 170 cannot reverse. When the pulse is removed, the potential of the collector of transistor 168 will become negative since it is connected to the collector of cut-off transistor 164. The potential of the collector of transistor 172 will remain substantially at ground potential since it is connected through isolating resistor 178 to the collector of bottomed transistor 162. Thus after the input pulse has been removed, the steering and inhibit gates reverse with gate 166 becoming enabled and gate 170 becoming disabled. Upon the application of the next succeeding, or second, complementing pulse, transistor 168 of enabled gate 166 will bottom, applying a positive going pulse to the base of transistor 162, which causes the master flip-flop to change its state. Gates 166, 170 will reverse after the termination of the second complementing pulse, and a complete cycle of operation is completed.

In FIG. 4 the collector supply voltages for transistors 168, 172 of gates 166, 170 is provided from master flip-flop 160. Resistance isolation is provided by resistors 174, 178 to insure that the triggering of the master flip-flop is by capacitor 176 or capacitor 180 and not by the D.C. drop across either load resistor 188 or load resistor 190.

The state of master flip-flop 160 may be determined by the potentials of the collectors of transistors 162, 164, which also may serve as the output terminals for the complementing flip-flop. Master flip-flop 160 may be set and reset by means of pulses applied to one or the other of a pair of transistors, one being connected in parallel with transistor 162 and the other being connected in parallel with transistor 164, as illustrated and described with respect to the device of FIG. 1.

In the examples of the embodiments of the invention illustrated in FIGS. 1, 3, and 4, all the transistors used were SB100's. The complementing flip-flops of FIGS. 1, 3, and 4 have been illustrated and described as using PNP transistors. As is well known in the art, NPN transistors may be substituted for PNP transistors provided the polarities of the supply voltages and the polarities of the triggering signals are reversed. It is required only that the transistor have two current-carrying electrodes and a control electrode.

The values and/or types of components and the voltages appearing on the drawings are included, by way of example only, as being suitable for the devices illustrated. It is to be understood that circuit specifications in accordance with the invention may vary with the design of any particular application.

Obviously, many modifications and variations of the present invention are possible in the light of the above teachings. It is, therefore, to be understood that within the scope of the appended claims, the invention may be practiced other than as specifically described and illustrated.

What is claimed is:

1. A complementing flip-flop comprising a master saturation flip-flop including two cross-coupled transistors, a first gate and a second gate, each of said gates having a first and a second transistor connected in series, an input terminal for the complementing flip-flop, circuit means connecting the input terminal of the complementing flip-flop to the base of the first transistor of each of said gates, a first capacitor connecting the collector of the first transistor of the first gate to the base of the first transistor of the master flip-flop, a second capacitor connecting the collector of the first transistor of the second gate to the base of the second transistor of the master flip-flop, circuit means connecting the collector of the first transistor of the master flip-flop to the base of the second transistor of the first gate, circuit means connecting the collector of the second transistor of the master flip-flop to the base of the second transistor of the second gate, and means biasing the collectors of said transistors of said master flip-flop and said first transistors of said gates.

2. A complementing flip-flop comprising a master flip-flop including two transistors, said master flip-flop having a first and a second input terminal and two states, a first steering and inhibit gate and a second steering and inhibit gate, each of said gates comprising first and second transistors connected in series, said gates having two states, an enabled state and a disabled state, a third input terminal adapted to have complementing pulses applied thereto, circuit means connecting the third terminal to the bases of the first transistors of the gates, circuit means directly connecting the base of the second transistor of the first gate to the collector of the first transistor of the master flip-flop, circuit means connecting the base of the second transistor of the second gate to the collector of the second transistor of the master flip-flop, a first capacitor connecting the collector of the first transistor of the first gate to the first input terminal of the master flip-flop, a second capacitor connecting the collector of the first transistor of the second gate to the second input terminal of the master flip-flop, each of said gates being enabled when its second transistor is prepared to conduct and being disabled when its second transistor is cut off, the enabled gate applying a pulse to the input terminal of the master flip-flop to change its state when a complementing pulse is applied to the third terminal, each said complementing pulse cutting off the first transistor of both gates so that the gates may not reverse while each complementing pulse is present.

3. A complementing flip-flop comprising a master cross-coupled saturation flip-flop including first and second transistors, a first steering and inhibit gate, a second steering and inhibit gate, each of said gates comprising a transistor, each of the above mentioned transistors having a base terminal, a collector terminal, and an emitter terminal, an input terminal adapted to have complementing pulses applied thereto, circuit means connecting the input terminal to the base terminal of the transistor of the gates, a first capacitor connecting one of the other terminals of the transistor of the first gate to the base terminal of the first transistor of the master flip-flop, an isolating resistor connecting said one terminal of the transistor of the first gate to the collector terminal of the second transistor of the master flip-flop, a second capacitor connecting the corresponding terminal of the transistor of the second gate to the base terminal of the second transistor of the master flip-flop, means biasing the collectors of said transistors of said master flip-flop, and an isolating resistor connecting said corresponding terminal of the transistor of the second gate to the collector terminal of the first transistor of the master flip-flop.

4. A complementing flip-flop comprising a master cross-coupled saturation flip-flop including first and second transistors, a first gate and a second gate, each of said gates including a transistor, a first capacitor connecting the collector of the transistor of the first gate to the base of the first transistor of the master flip-flop, a second capacitor connecting the collector of the transistor of the second gate to the base of the second transistor of the master flip-flop, a first isolating resistor connecting the collector of the transistor of the first gate to the collector of the second transistor of the master flip-flop, a second isolating resistor connecting the collector of the transistor of the second gate to the collector of the first transistor of the master flip-flop, means biasing the collectors of said transistors of said master flip-flop, and circuit means for applying complementing pulses to the base of the transistor of said gates.

5. A flip-flop comprising a pair of transistors each having a base, an emitter, and a collector, circuit means cross coupling their respective bases and collectors, a first source of potential coupled to said collectors of said pair, a gate associated with each transistor of said flip-flop, said gates each including first and second transistors having a base, an emitter, and a collector and also having the collector of one coupled to the emitter of the other, an impedance coupling the collector of the first transistor of each gate to the base of its associated flip-flop transistor, a coupling from the base of the second transistor of each gate to the collector of its associated flip-flop transistor, an input terminal coupled to the bases of the first transistor of both gates, a second source of operating potential coupled to said collectors of said gate transistors, and a source of reference potential coupled to the emitters of said flip-flop transistors and said second gate transistors.

6. A conditional steering, complementing bistable device comprising a master saturation flip-flop having two transistors, each of said transistors having a control electrode and two current-carrying electrodes, the control electrodes and one like current-carrying electrode of said transisters being cross-coupled, said one current-carrying electrode of each transistor being biased, individual gating means associated with each transistor of said master flip-flop, each gating means having an enabled state and a disabled state and each gating means having at least one transistor with a control electrode and two current-carrying electrodes, means capacitively coupling one like current-carrying electrode of said one transistor of each gate to the control electrode of its associated transistor of the master flip-flop, an input terminal for said device directly connected to said control electrodes of said one transistor of said gating means and adapted to receive pulses, whereby an input pulse applied simultaneously to both said gating means triggers said master flip-flop through the gating means in an enabled state by means of its capacitive coupling with the control electrode of its associated master flip-flop transistor, and circuit means coupling said master flip-flop transistors to said gates, whereby a change of state of said master flip-flop tends to change the state of said gates but is inhibited therefrom by said input pulse.

7. The conditional steering, complementing bistable device of claim 6 wherein said circuit means comprises isolating resistors individually connected between said electrode of said gating transistor capacitively coupled to said control electrode of said master flip-flop transistor and said electrode of said master flip-flop transistor cross-coupled to said control electrode.

8. The conditional steering, complementing bistable device of claim 6 wherein each of said gating means includes a second transistor, each having a control electrode and two current-carrying electrodes, serially connected to said one transistor and said circuit means comprises a connection between the control electrode of each of said second transistors and the biased electrode of its associated transistor of the master flip-flop.

References Cited in the file of this patent

UNITED STATES PATENTS

| | | |
|---|---|---|
| 2,549,071 | Dusek et al. | Apr. 17, 1951 |
| 2,854,572 | Strassner et al. | Sept. 30, 1958 |
| 2,909,675 | Edson | Oct. 20, 1959 |
| 2,954,484 | Hill et al. | Sept. 27, 1960 |
| 2,967,951 | Brown | Jan. 10, 1961 |

OTHER REFERENCES

Hunter: "Handbook of Semiconductor Electronics," McGraw-Hill Book Co., Inc., October 15, 1956, pp. 15–64, Figs. 16–65, TK7872 S4H8.

Millman and Taub, Pulse and Digital Circuits, McGraw-Hill, 1956, TK7835 M55 C.3 (page 162, Fig. 5.41(c) relied upon).